United States Patent
Fattal et al.

(10) Patent No.: US 12,253,692 B2
(45) Date of Patent: Mar. 18, 2025

(54) HORIZONTAL PARALLAX MULTIVIEW DISPLAY AND METHOD HAVING LIGHT CONTROL FILM

(71) Applicant: LEIA INC., Menlo Park, CA (US)

(72) Inventors: David A. Fattal, Menlo Park, CA (US); Ming Ma, Menlo Park, CA (US)

(73) Assignee: LEIA Inc., Menlo Park, CA (US)

( * ) Notice: Subject to any disclaimer, the term of this patent is extended or adjusted under 35 U.S.C. 154(b) by 288 days.

(21) Appl. No.: 17/392,129

(22) Filed: Aug. 2, 2021

(65) Prior Publication Data

US 2021/0368158 A1    Nov. 25, 2021

Related U.S. Application Data

(63) Continuation of application No. PCT/US2019/066623, filed on Dec. 16, 2019.
(Continued)

(51) Int. Cl.
   *G02B 30/33*     (2020.01)
   *G02B 5/18*      (2006.01)
   (Continued)

(52) U.S. Cl.
   CPC .......... *G02B 30/33* (2020.01); *G02B 5/1819* (2013.01); *G02B 27/4272* (2013.01);
   (Continued)

(58) Field of Classification Search
   CPC ...... G02B 30/32; G02B 30/33; G02B 5/1819; G02B 27/4272; G02B 2207/123; H04N 13/349; H04N 13/354; G02F 1/29
   See application file for complete search history.

(56) References Cited

U.S. PATENT DOCUMENTS 5,689,283 A   11/1997 Shirochi
6,064,424 A   5/2000 Van Berkel et al.
(Continued)

FOREIGN PATENT DOCUMENTS

CA   3125431      8/2020
CA   3125536 A1   8/2020
(Continued)

OTHER PUBLICATIONS

International Search Report and Written Opinion (ISRWO) by International Searching Authority (ISA) Korean Intellectual Property Office (KIPO) dated Apr. 16, 2020 (12 pages) for foreign counterpart parent PCT Application No. PCT/US2019/066623.
(Continued)

*Primary Examiner* — Jessica M Merlin
(74) *Attorney, Agent, or Firm* — Schwegman Lundberg & Woessner, P.A.

(57) ABSTRACT

A horizontal parallax multiview display employs a plurality of slanted multibeam columns to scatter out of a light guide a plurality of directional light beams having principal angular directions corresponding to different view directions of the horizontal parallax multiview display. The plurality of directional light beams is modulated using an array of light valves to provide a multiview image having horizontal parallax. Further, the horizontal parallax multiview display employs a light control film having a slanted light control axis aligned with slanted multibeam columns of the slanted multibeam column plurality. The light control film is configured to control a view angle of the multiview image in a direction orthogonal to the horizontal parallax. The slanted multibeam columns may provide the multiview displays with a balanced resolution.

20 Claims, 7 Drawing Sheets

Related U.S. Application Data

(60) Provisional application No. 62/806,807, filed on Feb. 16, 2019.

(51) Int. Cl.

| | | |
|---|---|---|
| *G02B 27/01* | (2006.01) | |
| *G02B 27/42* | (2006.01) | |
| *G02B 30/32* | (2020.01) | |
| *G02F 1/29* | (2006.01) | |
| *H04N 13/312* | (2018.01) | |
| *H04N 13/32* | (2018.01) | |
| *H04N 13/349* | (2018.01) | |

(52) U.S. Cl.
CPC ............... *G02B 30/32* (2020.01); *G02F 1/29* (2013.01); *H04N 13/312* (2018.05); *H04N 13/32* (2018.05); *H04N 13/349* (2018.05); *G02B 27/0101* (2013.01); *G02B 2027/0134* (2013.01); *G02B 2207/123* (2013.01)

(56) References Cited

U.S. PATENT DOCUMENTS

| | | | |
|---|---|---|---|
| 7,876,397 B2 | 1/2011 | Krijn et al. | |
| 8,506,150 B2 | 8/2013 | Kashiwagi et al. | |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 10,408,992 B2 | 9/2019 | Woodgate et al. | |
| 10,551,546 B2 | 2/2020 | Fattal | |
| 10,649,128 B2 | 5/2020 | Fattal et al. | |
| 10,798,371 B2 | 10/2020 | Fattal | |
| 10,802,212 B2 | 10/2020 | Fattal | |
| 10,802,443 B2 | 10/2020 | Fattal | |
| 10,810,917 B2 | 10/2020 | Fattal | |
| 10,830,939 B2 | 11/2020 | Fattal et al. | |
| 10,838,134 B2 | 11/2020 | Fattal et al. | |
| 10,884,175 B2 | 1/2021 | Fattal | |
| 10,901,212 B2 | 1/2021 | Fattal | |
| 10,928,564 B2 | 2/2021 | Fattal | |
| 10,928,677 B2 | 2/2021 | Aieta et al. | |
| 10,969,627 B2 | 4/2021 | Fattal et al. | |
| 11,004,407 B2 | 5/2021 | Fattal et al. | |
| 11,011,121 B2 | 5/2021 | Fattal et al. | |
| 11,016,235 B2 | 5/2021 | Fattal et al. | |
| 11,041,988 B2 | 6/2021 | Fattal et al. | |
| 11,048,036 B2 | 6/2021 | Ma et al. | |
| 11,846,800 B2 | 12/2023 | Fattal | |
| 12,196,983 B2 | 1/2025 | Fattal et al. | |
| 2003/0052836 A1 | 3/2003 | Matsumoto et al. | |
| 2005/0248972 A1 | 11/2005 | Kondo et al. | |
| 2006/0152435 A1 | 7/2006 | Kondo et al. | |
| 2007/0152997 A1 | 7/2007 | Lee | |
| 2008/0211977 A1* | 9/2008 | Ijzerman | H04N 13/31 348/E13.044 |
| 2009/0262420 A1 | 10/2009 | Yun et al. | |
| 2009/0322986 A1 | 12/2009 | Wei et al. | |
| 2010/0245406 A1 | 9/2010 | Redert et al. | |
| 2012/0092339 A1 | 4/2012 | Pijlman et al. | |
| 2012/0200807 A1 | 8/2012 | Wei et al. | |
| 2012/0224389 A1* | 9/2012 | Kashiwagi | G02B 6/0043 362/608 |
| 2013/0057159 A1 | 3/2013 | Pijlman et al. | |
| 2013/0169518 A1 | 7/2013 | Wu et al. | |
| 2013/0241964 A1 | 9/2013 | Ohyama et al. | |
| 2013/0250568 A1 | 9/2013 | Koito et al. | |
| 2013/0293851 A1 | 11/2013 | Tsai | |
| 2013/0335538 A1 | 12/2013 | Shestak et al. | |
| 2014/0063213 A1 | 3/2014 | Tsuchihashi et al. | |
| 2014/0285642 A1 | 9/2014 | Hwang et al. | |
| 2015/0036068 A1* | 2/2015 | Fattal | G02F 1/133615 362/606 |
| 2016/0132025 A1 | 5/2016 | Taff et al. | |
| 2016/0195664 A1 | 7/2016 | Fattal et al. | |
| 2016/0219271 A1 | 7/2016 | Wei | |
| 2016/0291339 A1* | 10/2016 | Minami | G02B 30/33 |
| 2017/0363794 A1 | 12/2017 | Wan et al. | |
| 2018/0188691 A1 | 7/2018 | Fattal | |
| 2018/0196194 A1 | 7/2018 | Fattal | |
| 2018/0284341 A1 | 10/2018 | Woodgate et al. | |
| 2018/0292647 A1 | 10/2018 | Fattal | |
| 2019/0302336 A1 | 10/2019 | Fattal et al. | |
| 2020/0033526 A1 | 1/2020 | Fattal et al. | |
| 2020/0301165 A1 | 9/2020 | Fattal | |
| 2020/0310135 A1 | 10/2020 | Fattal | |
| 2020/0409172 A1 | 12/2020 | Fattal | |
| 2021/0364816 A1 | 11/2021 | Fattal et al. | |

FOREIGN PATENT DOCUMENTS

| | | |
|---|---|---|
| CN | 102298256 | 12/2011 |
| CN | 103389582 | 11/2013 |
| CN | 103403607 | 11/2013 |
| CN | 107144972 A | 9/2017 |
| CN | 107923600 | 4/2018 |
| CN | 113439228 | 9/2021 |
| CN | 113498489 | 10/2021 |
| EP | 0606162 | 7/1994 |
| EP | 0791847 | 8/1997 |
| EP | 2682805 | 1/2014 |
| EP | 3924766 | 12/2021 |
| EP | 3924772 A1 | 12/2021 |
| EP | 3924766 B1 | 7/2024 |
| EP | 3924772 | 11/2024 |
| GB | 2428857 | 2/2007 |
| JP | 2004012644 | 1/2004 |
| JP | 2004023203 | 1/2004 |
| JP | 2007507071 | 3/2007 |
| JP | 2007183611 A | 7/2007 |
| JP | 2008102430 A | 5/2008 |
| JP | 2011002832 A | 1/2011 |
| JP | 2012155307 A | 8/2012 |
| JP | 2012185275 | 9/2012 |
| JP | 2013105675 A | 5/2013 |
| JP | 2013190537 | 9/2013 |
| JP | 2013200401 A | 10/2013 |
| JP | 2014512560 A | 5/2014 |
| JP | 2018072507 A | 5/2018 |
| JP | 2022520582 A | 3/2022 |
| JP | 2022524582 | 5/2022 |
| JP | 7270050 B2 | 4/2023 |
| JP | 7418454 | 1/2024 |
| KR | 101188429 | 10/2012 |
| KR | 20180101356 | 9/2018 |
| KR | 20210107896 | 9/2021 |
| KR | 20210110737 A | 9/2021 |
| KR | 20210144938 | 11/2021 |
| KR | 102606460 B1 | 11/2023 |
| KR | 10-2695679 | 8/2024 |
| TW | 201732370 A | 9/2017 |
| TW | 201804216 | 2/2018 |
| TW | 202037951 | 10/2020 |
| TW | 202043843 A | 12/2020 |
| TW | 1735159 B | 8/2021 |
| TW | I735157 | 8/2021 |
| WO | 2012038856 A1 | 3/2012 |
| WO | 2013162609 | 10/2013 |
| WO | 2017041079 | 3/2017 |
| WO | 2018186955 | 10/2018 |
| WO | WO-2018186892 A1 | 10/2018 |
| WO | 2018213100 | 11/2018 |
| WO | 2018213101 | 11/2018 |
| WO | WO-2018236372 A1 | 12/2018 |
| WO | 2020131087 A1 | 6/2020 |
| WO | 2020167373 | 8/2020 |

(56) References Cited

FOREIGN PATENT DOCUMENTS

| WO | 2020167374 A1 | 8/2020 |
|---|---|---|
| WO | 2020222770 A1 | 11/2020 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

"U.S. Appl. No. 17/394,157, Restriction Requirement mailed Jan. 12, 2024", 6 pgs.

"International Application Serial No. PCT US2019 066630, International Search Report mailed Apr. 20, 2020", 5 pgs.

"International Application Serial No. PCT US2019 066630, Written Opinion mailed Apr. 20, 2020", 6 pgs.

"International Application Serial No. PCT US2019 066630, International Preliminary Report on Patentability mailed Aug. 26, 2021", 8 pgs.

"International Application Serial No. PCT US2019 029730, International Preliminary Report on Patentability mailed Nov. 11, 2021", 9 pgs.

"International Application Serial No. PCT US2019 029730, International Search Report mailed Jan. 28, 2020", 5 pgs.

"International Application Serial No. PCT US2019 029730, Written Opinion mailed Jan. 28, 2020", 7 pgs.

"Korean Application Serial No. 10-2021-7037966, Notice of Preliminary Rejection mailed Jan. 22, 2024", W English Translation, 26 pgs.

"European Application Serial No. 19915384.2, Extended European Search Report mailed Oct. 19, 2022", 10 pgs.

"U.S. Appl. No. 17/394,157, Non Final Office Action mailed May 2, 2024", 30 pgs.

"Korean Application Serial No. 10-2021-7037966, Response filed Apr. 30, 2024 to Notice of Preliminary Rejection mailed Jan. 22, 2024", W English Claims, 20 pgs.

"Canadian Application Serial No. 3,125,431, Office Action mailed Sep. 20, 2022", 3 pgs.

"Canadian Application Serial No. 3,125,431, Office Action mailed May 3, 2023", 4 pgs.

"Canadian Application Serial No. 3,125,431, Response filed Jan. 16, 2023 to Office Action mailed Sep. 20, 2022", 9 pgs.

"Canadian Application Serial No. 3,125,431, Response filed Aug. 22, 2023 to Office Action mailed May 3, 2023", 6 pgs.

"European Application Serial No. 19915384.2, Response to Communication pursuant to Rules 161(2) and 162 EPC filed Mar. 16, 2022", 13 pgs.

"European Application Serial No. 19915384.2, Response filed Apr. 18, 2023 to Extended European Search Report mailed Oct. 19, 2022", 15 pgs.

"European Application Serial No. 19915384.2, Intention to Grant mailed Mar. 28, 2024", 6 pgs.

"International Application Serial No. PCT US2019 066623, International Preliminary Report on Patentability mailed Aug. 26, 2021", 7 pgs.

"Japanese Application Serial No. 2021-547486, Notice of Reason for Rejection mailed Nov. 22, 2022", w English translation, 10 pgs.

"Japanese Application Serial No. 2021-547486, Decision of Rejection mailed Jun. 20, 2023", w English translation, 9 pgs.

"Korean Application Serial No. 10-2021-7026488, Notice of Preliminary Rejection mailed Oct. 12, 2023", w English translation, 18 pgs.

"Chinese Application Serial No. 201980092231.0, Office Action mailed Nov. 2, 2022", w English translation, 28 pgs.

"Taiwanese Application Serial No. 109104612, Office Action mailed Dec. 18, 2020", w English translation, 8 gps.

"Chinese Application Serial No. 201980092211.3, Office Action mailed Nov. 1, 2022", w English translation, 19 pgs.

U.S. Appl. No. 17/394,157, filed Aug. 4, 2021, Multiview Display and Method Having Light Control Film.

"European Application Serial No. 19914831.3, Extended European Search Report mailed Nov. 25, 2022", 8 pgs.

"Canadian Application Serial No. 3,125,536, Office Action mailed Sep. 20, 2022", 3 pgs.

"Canadian Application Serial No. 3,125,536, Office Action mailed May 26, 2023", 4 pgs.

"European Application Serial No. 19927204.8, Extended European Search Report mailed Nov. 11, 2022", 11 pgs.

"U.S. Appl. No. 17/394,157, Notice of Allowance mailed Aug. 22, 2024", 9 pgs.

"U.S. Appl. No. 17/394,157, Response filed Feb. 26, 2024 to Restriction Requirement mailed Jan. 12, 2024", 9 pgs.

"U.S. Appl. No. 17/394,157, Response filed Jul. 30, 2024 to Non Final Office Action mailed May 2, 2024", 13 pgs.

"Canadian Application Serial No. 3,125,536, Response filed Jan. 17, 2023 to Office Action mailed Sep. 20, 2022", 9 pgs.

"Canadian Application Serial No. 3,125,536, Response filed Sep. 20, 2023 to Office Action mailed May 26, 2023", 6 pgs.

"European Application Serial No. 19914831.3, Intention to Grant mailed May 17, 2024", 6 pgs.

"European Application Serial No. 19914831.3, Response filed Jun. 5, 2023 to Extended European Search Report mailed Nov. 25, 2022", 16 pgs.

"European Application Serial No. 19914831.3, Response filed Jul. 12, 2024 to Intention to Grant mailed May 17, 2024", Text was not approved, amendment submitted, 6 pgs.

"European Application Serial No. 19914831.3, Response to Communication pursuant to Rules 161(2) and 162 EPC filed Mar. 31, 2022", 13 pgs.

"European Application Serial No. 19927204.8, Communication Pursuant to Article 94(3) EPC mailed Jul. 11, 2024", 6 pgs.

"Japanese Application Serial No. 2021-547229, Notification of Reasons for Rejection mailed Sep. 27, 2022", W/English Translation, 6 pgs.

"Korean Application Serial No. 10-2021-7027044, Notice of Preliminary Rejection mailed Mar. 8, 2023", W/English Translation, 14 pgs.

"Korean Application Serial No. 10-2021-7027044, Response filed Apr. 26, 2023 to Notice of Preliminary Rejection mailed Mar. 8, 2023", W/English Claims, 22 pgs.

"Taiwanese Application Serial No. 109104808, Office Action mailed Feb. 21, 2020", W/ English Translation, 7 pgs.

"Taiwanese Application Serial No. 109104808, Office Action mailed Jun. 1, 2021", W/English Translation, 3 pgs.

"Taiwanese Application Serial No. 109104808, Office Action mailed Dec. 18, 2020", W/English Translation, 16 pgs.

"Taiwanese Application Serial No. 109104808, Response filed Mar. 11, 2021 to Office Action mailed Dec. 18, 2020", W/ English translation, 42 pgs.

"Taiwanese Application Serial No. 109104808, Response filed Jun. 2, 20 to Office Action mailed Feb. 21, 2020", W/ English translation, 135 pgs.

(56) References Cited

OTHER PUBLICATIONS

"Canadian Application Serial No. 3,125,536, Voluntary Amendment filed Oct. 1, 2024", 7 pgs.
"Korean Application Serial No. 10-2021-7037966, Notice of Preliminary Rejection mailed Nov. 27, 2024", w English translation, 24 pgs.
"European Application Serial No. 19927204.8, Response filed Nov. 11, 2024 to Communication Pursuant to Article 94(3) EPC mailed Jul. 11, 2024", 5 pgs.
"U.S. Appl. No. 17/394,157, Supplemental Notice of Allowability mailed Dec. 11, 2024", 3 pgs.

* cited by examiner

HORIZONTAL PARALLAX MULTIVIEW DISPLAY AND METHOD HAVING LIGHT CONTROL FILM

CROSS-REFERENCE TO RELATED APPLICATIONS

This application is a continuation application of and claims the benefit of priority to International Patent Application No. PCT/US2019/066623, filed on Dec. 16, 2019, which claims priority to U.S. Provisional Application Ser. No. 62/806,807, filed on Feb. 16, 2019, the entire contents of both of which are herein incorporated by reference. Moreover, the entire contents of International Patent Application No. PCT/US2018/022760, filed on Mar. 15, 2018, are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing slanted multibeam columns and having a light control film (LCF) with application to electronic displays. In particular, according to various embodiments consistent with the principles herein, a horizontal parallax multiview display comprising a plurality of slanted multibeam columns is provided. The slanted multibeam columns are configured to scatter light out of the light guide as emitted light. The multibeam columns feature a slant that is a function of a pixel width and a pixel-view arrangement of the horizontal parallax multiview display. The slanted multibeam columns may serve to provide horizontal parallax multiview displays with balanced resolution, i.e., substantially the same resolution along a length and a width of the horizontal parallax multiview display. The horizontal parallax multiview display further includes a light control film having a light control axis that is aligned with the slant of the multibeam columns, according to various embodiments.

Herein, a 'multiview display' is defined as an electronic display or display system configured to provide different views of a multiview image in different view directions. A 'horizontal parallax' multiview display is a multiview display that is configured to provide the different views of the multiview image in different view directions confined to a single plane (e.g., a horizontal plane), by definition herein.

Figure 1A:
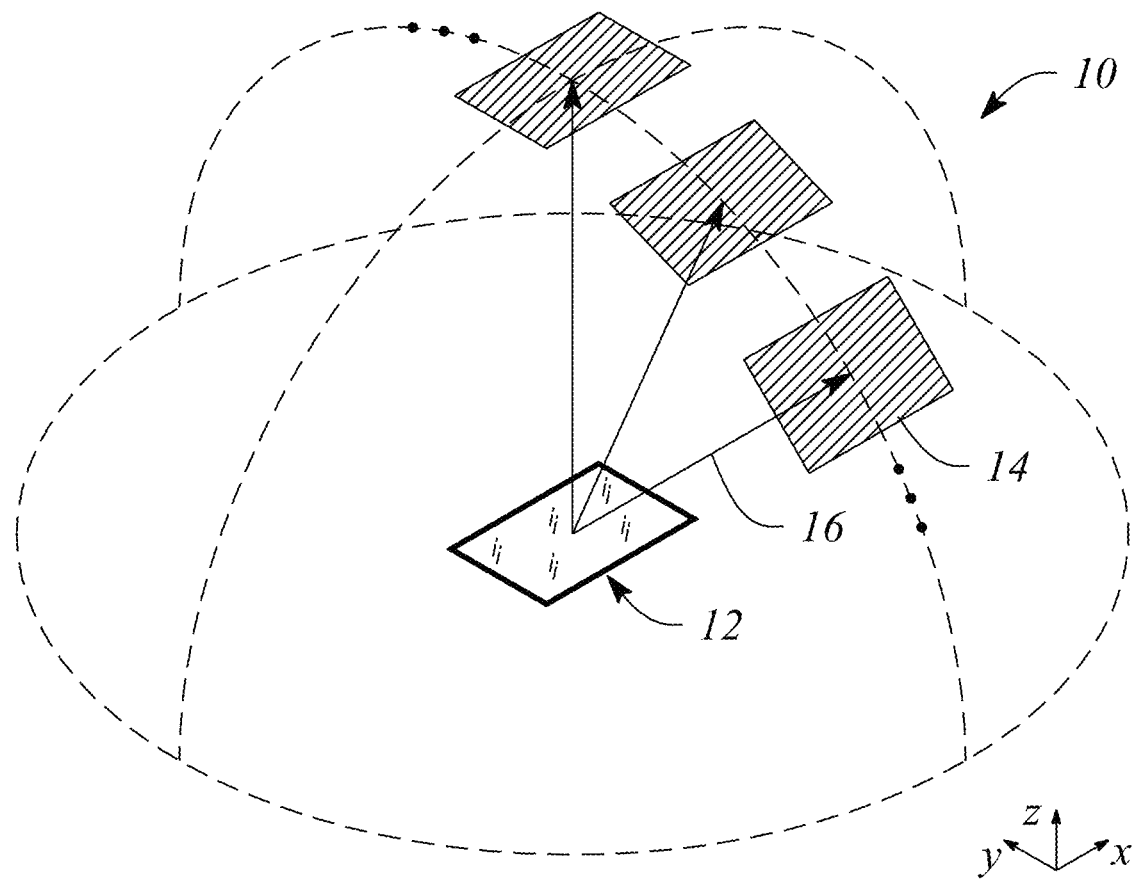
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. In particular, multiview display 10 is configured as a horizontal parallax multiview display with the different views being confined to a y-z plane, as illustrated in FIG. 1A by way of example and not limitation. The multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A 'view direction' or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\varphi$ is an angle in a horizontal plane (e.g., parallel to the multiview display screen plane).

Figure 1B:
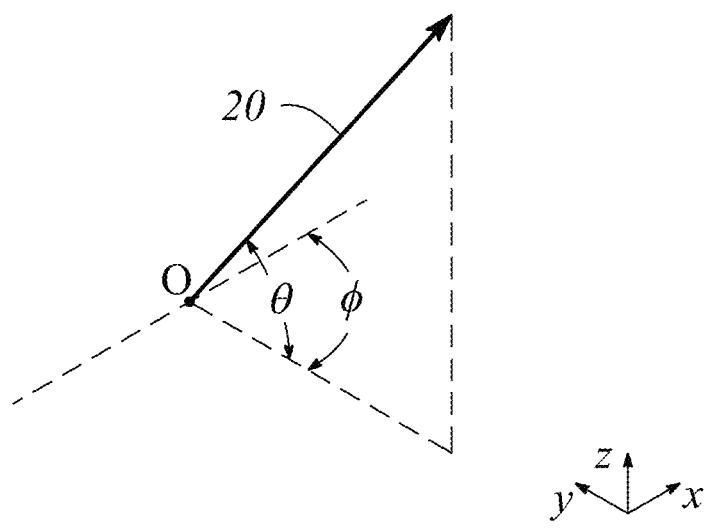
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between different views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each view of a plurality of different views of a multiview image provided by a multiview display. Likewise, a 'view pixel' is defined herein as a pixel of a view of the multiview image. In particular, a multiview pixel may have an individual pixel corresponding to or representing a view pixel in each of the different views of the multiview image. For example, the multiview pixel may comprise a set of light valves in a light valve array of the multiview display and a pixel of the multiview pixel may comprise a light valve of the light valve array. In turn, the view pixels may be provided by modulation of light using the light valves such that a pixel or light valve of the light valve array corresponds to or provides the modulation to create the corresponding view pixel. Moreover, the pixels of the multiview pixel are so-called 'directional pixels' in that each of the pixels is associated with a predetermined view direction of a corresponding one of the different views, by definition herein. Further, according to various examples and embodiments, the different view pixels represented by the pixels of a multiview pixel may have equivalent or at least substantially similar locations or coordinates in each of the different views. For example, a first multiview pixel may have individual pixels corresponding to view pixels located at $\{x_1, y_1\}$ in each of the different views of a multiview image, while a second multiview pixel may have individual pixels corresponding to view pixels located at $\{x_2, y_2\}$ in each of the different views, and so on. In some embodiments, a number of pixels in a multiview pixel may be equal to a number of different views of the multiview display. Further, according to some embodiments, a number of multiview pixels of the multiview display may be substantially equal to a number of 'view' pixels (i.e., pixels that make up a selected view) in the multiview display views.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

By definition herein, a 'multibeam element' is a structure or element of a backlight or a display that produces light that includes a plurality of directional light beams. Directional light beams of the plurality of directional light beams (or 'directional light beam plurality') produced by a multibeam element have different principal angular directions from one another, by definition herein. In particular, by definition, a directional light beam of the directional light beam plurality has a predetermined principal angular direction that is different from another directional light beam of the directional light beam plurality. According to some embodiments, a size of the multibeam element may be comparable to a size of a light valve used in a display that is associated with the multibeam element (e.g., a multiview display). In particular, the multibeam element size may be between about one half and about two times the light valve size, in some embodiments.

According to various embodiments, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the directional light beam plurality) may represent the light field.

According to various embodiments, the different principal angular directions of the various directional light beams in the directional light beam plurality are determined by a characteristic including, but not limited to, a size (e.g., one or more of length, width, area, and etc.) of the multibeam element along with other characteristics. For example, in a diffractive multibeam element, a 'grating pitch' or a diffractive feature spacing and an orientation of a diffraction grating within diffractive multibeam element may be characteristics that determine, at least in part, the different principal angular directions of the various directional light beams. In some embodiments, the multibeam element may be considered an 'extended point light source', i.e., a plurality of point light sources distributed across an extent of the multibeam element, by definition herein. Further, a directional light beam produced by the multibeam element may have a principal angular direction given by angular components $\{\theta,\varphi\}$, as described below with respect to FIG. 1B.

Herein, a 'multibeam column' is defined as an elongated structure comprising a plurality of multibeam elements arranged in a line or column. In particular, the multibeam column is made up of multibeam elements of the multibeam element plurality arranged in a line or column. Further, the multibeam column is configured to provide or emit light that includes a plurality of directional light beams, by definition. As such, the multibeam column may be functionally similar to the multibeam element with regard to its light scattering properties. That is, the directional light beams of the plurality of directional light beams produced by a multibeam element of the multibeam column have different principal angular directions from one another, by definition herein. In some embodiments, the multibeam column may be a narrow elongated structure that substantially extends across a width of a backlight or similar component of a multiview display. In particular, the multibeam column may be made up of a plurality of discrete multibeam elements arranged in a line that extends across the backlight width, for example. An exception to the definition above is that, the multibeam column comprise a single, continuous diffraction grating structure instead of individual discrete multibeam elements, in some embodiments. In the exception, a section of the continuous diffraction grating effectively functions in a manner that is substantially similar to the discrete multibeam element of the multibeam column described above.

According to various embodiments, a width of the multibeam column may defined by a size of a multibeam element of the multibeam element plurality of the multibeam column. Thus, the width of the multibeam column may be comparable to a width of a light valve used in a multiview display that is associated with the multibeam column. Further, the multibeam column width may be between about one half and about two times the light valve size, in some embodiments.

In various embodiments, the multibeam column has a slant or slant angle. That is, the multibeam column may extend at an angle (i.e., slant angle) relative to an axis of the backlight or multiview display. In particular, by definition herein, a 'slanted multibeam column' is a multibeam column that is slanted (or equivalently, has a 'slant') in relation to the axis. The slant or slope of the multibeam column is an expression of the degree of steepness or incline of the multibeam column. The slant may therefore be defined as the ratio of vertical change and horizontal change along a section of the multibeam column or in the alternative, the ratio of horizontal change and vertical change along the section. In some embodiments, the slant may be expressed as the ratio of horizontal pixels over vertical pixels of the multiview display along a section of the multibeam column. More specifically, the slant may be expressed as the horizontal change per row of pixel associated with the multiview display in a particular section of the backlight. Accordingly, the slant may be defined by the pixel width divided by number of rows in the section of the backlight.

A 'pixel-view arrangement' is defined herein as a spatial organization of a set of pixels representing view pixels on the multiview display. That is, the pixel-view arrangement of a multiview display defines the location of each view pixel in the plurality of view pixels comprising the set of pixels. For example, for a multiview display providing eight (8) views in a horizontal parallax view configuration (e.g., as illustrated in FIG. 1A), the pixel-view arrangement may comprise a single row of 8 pixels arranged consecutively. In another example where a multiview pixel provides nine (9) views in a horizontal parallax configuration, the pixel-view arrangement may comprise two adjacent rows with five (5) pixels in a first row and four (4) pixels in a second row. The pixels in each row may be arranged consecutively. In some examples, the first row may comprise odd-numbered pixels arranged consecutively, whereas the second row may comprise even-numbered pixels arranged consecutively.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element (or of a multibeam column), as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
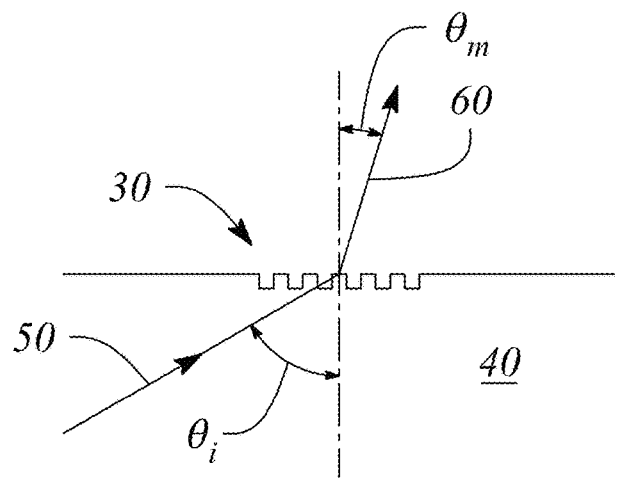
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example.

Further, as used herein, the article 'a' is intended to have its ordinary meaning in the patent arts, namely 'one or more'. For example, 'a multibeam column' means one or more multibeam columns and as such, 'the multibeam column' means 'the multibeam column(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
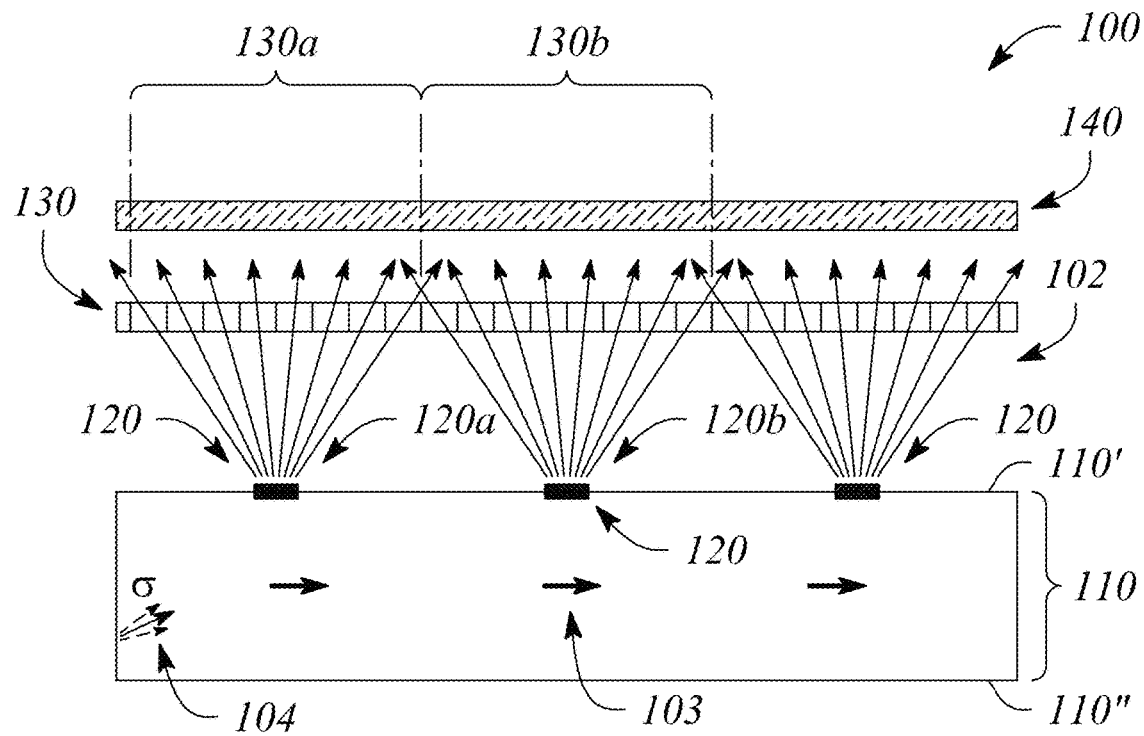
FIG. 3A illustrates a cross-sectional view of a horizontal parallax multiview display in an example, according to an embodiment consistent with the principles described herein.
Figure 3B:
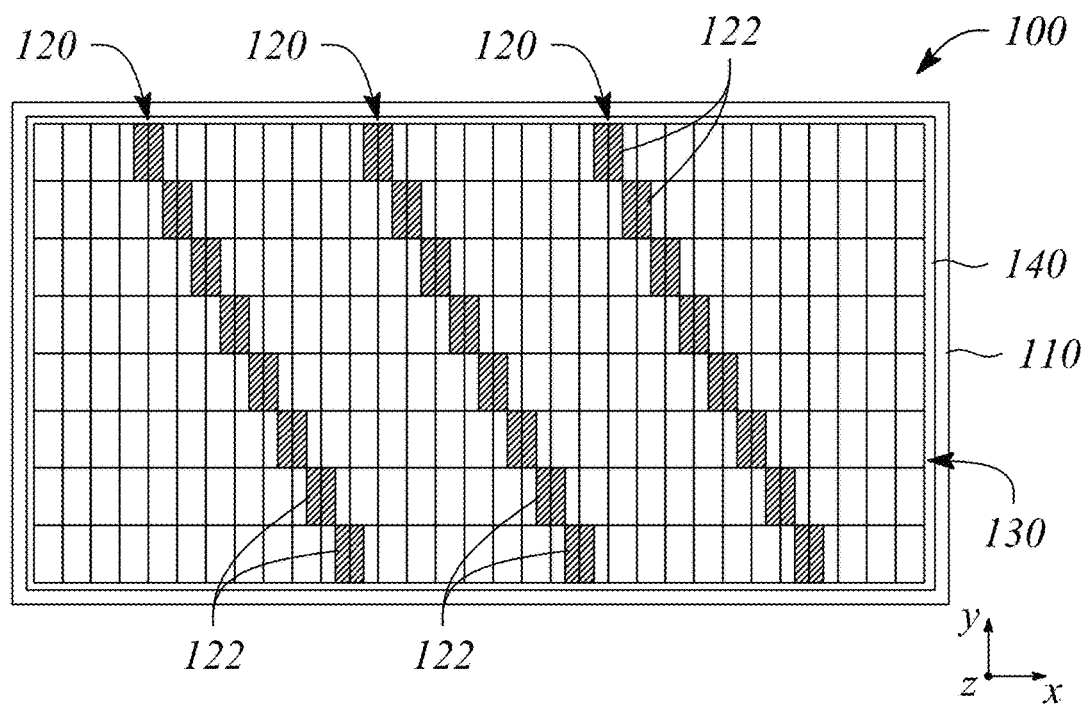
FIG. 3B illustrates a plan view of a horizontal parallax multiview display in an example, according to an embodiment consistent with the principles herein.
Figure 3C:
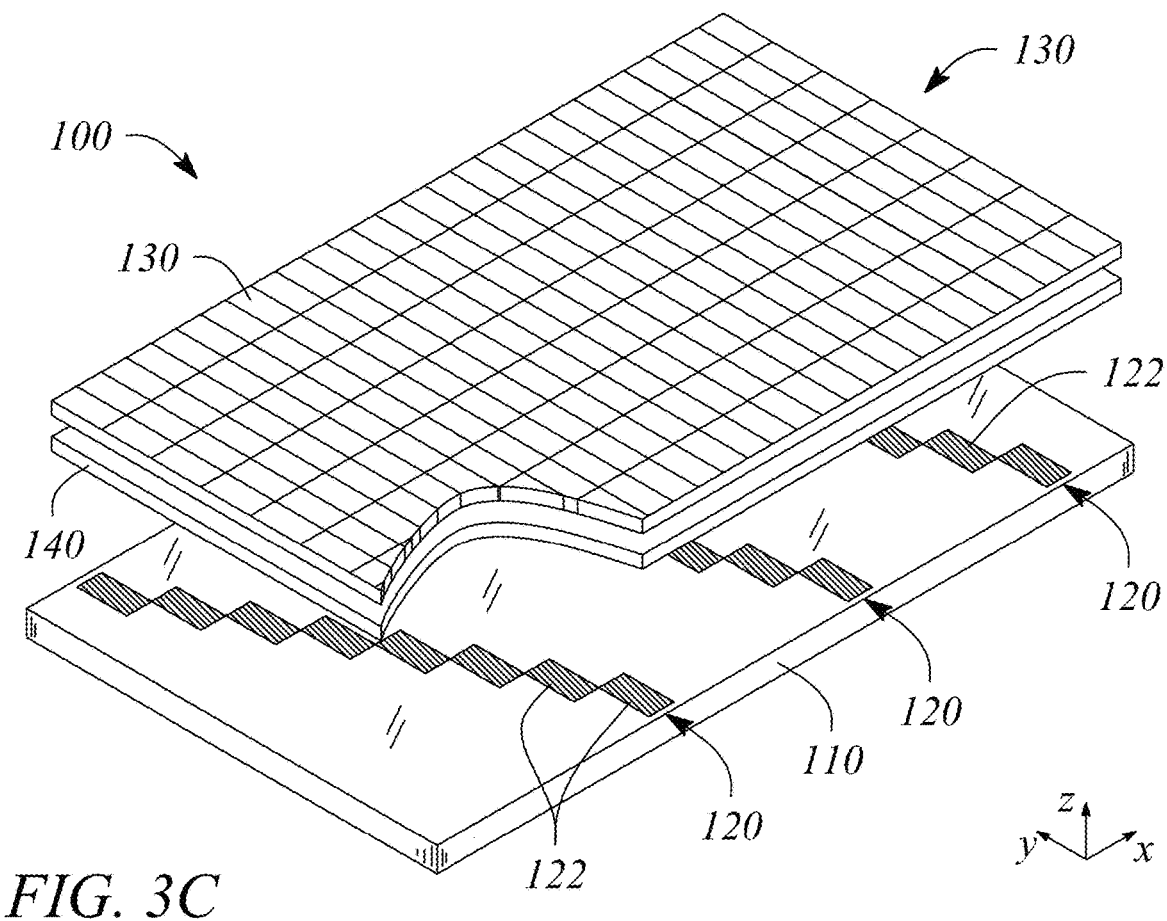
FIG. 3C illustrates a perspective view of a horizontal parallax multiview display in an example, according to an embodiment consistent with the principles described herein.

According to some embodiments of the principles described herein, a horizontal parallax multiview display is provided. The horizontal parallax multiview display employs slanted multibeam columns and pixel-view arrangements to provide the horizontal parallax multiview display with a balanced resolution comparable to a corresponding full parallax display, in some examples. FIG. 3A illustrates a cross-sectional view of a horizontal parallax multiview display 100 in an example, according to an embodiment consistent with the principles described herein. FIG. 3B illustrates a plan view of a horizontal parallax multiview display 100 in an example, according to an embodiment consistent with the principles herein. FIG. 3C illustrates a perspective view of a horizontal parallax multiview display 100 in an example, according to an embodiment consistent with the principles described herein.

As illustrated in FIGS. 3A-3C, the horizontal parallax multiview display 100 comprises a light guide 110. The light guide 110 is configured to guide light along a length of the light guide 110 as guided light 104 (i.e., a guided light beam 104). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the first surface and the second surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., 'front' or 'top' surface or side) and a second surface 110" (e.g., 'back' or 'bottom' surface or side) of the light guide 110. In particular, the guided light 104 propagates by reflecting or 'bouncing' between the first surface 110' and the second surface 110" of the light guide 110 at the non-zero propagation angle. In some embodiments, a plurality of guided light beams 104 comprising different colors of light may be guided by the light guide 110 at respective ones of different color-specific, non-zero propagation angles. Note, the non-zero propagation angle is not illustrated in FIG. 3A for simplicity of illustration. However, a bold arrow depicting a propagation direction 103 illustrates a general propagation direction of the guided light 104 along the light guide length in FIG. 3A.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten degrees (10°) and about fifty degrees (50°) or, in some examples, between about twenty degrees (20°) and about forty degrees (40°), or between about twenty-five degrees (25°) and about thirty-five degrees (35°). For example, the non-zero propagation angle may be about thirty degrees (30°). In other examples, the non-zero propagation angle may be about 20°, or about 25°, or about 35°. Moreover, a specific non-zero propagation angle may be chosen (e.g., arbitrarily) for a particular implementation as long as the specific non-zero propagation angle is chosen to be less than the critical angle of total internal reflection within the light guide 110.

According to various embodiments, the horizontal parallax multiview display 100 further comprises a plurality of slanted multibeam columns 120 spaced apart from one another along the length of the light guide 110. Further, each of the slanted multibeam columns 120 comprise a plurality of multibeam elements 122 arranged in a line or column correspond to the slanted multibeam column 120, as illustrated. A slanted multibeam column 120 of the slanted multibeam column plurality (or equivalently the plurality of multibeam elements 122 thereof) may be located on a surface of the light guide 110. For example, the slanted multibeam column 120 may be located on a first surface 110' of the light guide 110, as illustrated in FIGS. 3A and 3C. In other embodiments (not illustrated), the slanted multibeam column 120 may be located on a second surface 110" of the light guide 110 or even between the first and second surfaces 110', 110".

As illustrated in FIGS. 3A-3C, the slanted multibeam columns 120 extend across a width of the light guide 110. That is, the slanted multibeam column 120 of the slanted multibeam column plurality is oriented substantially along the y-axis of the light guide 110, such that the guided light 104 propagating through the light guide 110 intersects the slanted multibeam column 120 at a substantially steep angle. Further, the slanted multibeam columns 120 of the slanted multibeam column plurality are spaced apart from on another along the length (or x-axis) of the light guide 110. In some embodiments, the slanted multibeam columns 120 are parallel to one another. In some embodiments, adjacent slanted multibeam columns 120 are separated from one another by constant interval or distance.

The slanted multibeam column 120 of the slanted multibeam column plurality is configured to scatter out of the light guide 110 a portion of the guided light 104 as a plurality of directional light beams 102 (and thus may be referred to as directional emitted light). In FIG. 3A, the directional light beams 102 are illustrated as a plurality of diverging arrows depicted as being directed way from the first (or front) surface 110' of the light guide 110. According to various embodiments, the directional light beams 102 have different principal angular directions from one another. Further, the different principal angular directions of the directional light beams 102 may correspond to respective different view directions of the horizontal parallax multiview display 100, according to various embodiments.

According to various embodiments, multibeam elements 122 of the slanted multibeam column 120 may comprise any of a number of different structures configured to scatter out the portion of the guided light 104 and provide the directional light beams 102. For example, the different structures may include, but are not limited to, diffraction gratings, micro-reflective elements, micro-refractive elements, or various combinations thereof. In some embodiments, the slanted multibeam column 120 comprising a diffraction grating is configured to diffractively scatter out the guided light portion as the plurality of directional light beams 102 having the different principal angular directions. In other embodiments, the slanted multibeam column 120 comprising a micro-reflective element is configured to reflectively scatter out the guided light portion as the plurality of directional light beams 102, or the slanted multibeam column 120 comprising a micro-refractive element is configured to scatter out the guided light portion as the plurality of directional light beams 102 by or using refraction (i.e., refractively couple out the guided light portion).

The horizontal parallax multiview display 100 illustrated in FIGS. 3A-3C further comprises an array of light valves 130 representing pixels of the horizontal parallax multiview display 100 or equivalently corresponding to view pixels of a multiview image displayed by the horizontal parallax multiview display 100. In particular, the array of light valves 130 is configured to modulate directional light beams 102 scattered out of the light guide 110 by the plurality of slanted multibeam columns 120 to provide the multiview image. In FIG. 3C, the array of light valves 130 is partially cut-away to allow visualization of the light guide 110 and the slanted multibeam columns 120 underlying the light valve array, for discussion purposes only.

As illustrated in FIG. 3A, different ones of the directional light beams 102 having different principal angular directions pass through and may be modulated by different ones of the light valves 130 in the light valve array. Further, as illustrated, a light valve 130 of the array corresponds to a pixel of the horizontal parallax multiview display 100. In particular, along each row of the light valve array, a different set of light valves 130 of the light valve array is configured to receive and modulate directional light beams 102 from a corresponding different one of the slanted multibeam columns 120. As such, for each set of light valves 130 in each row of the light valve array there is a unique corresponding slanted multibeam column 120.

For example, a first light valve set 130a in a row of the light valve array is configured to receive and modulate the directional light beams 102 from a first slanted multibeam column 120a. Similarly, a second light valve set 130b in the row of the light valve array is configured to receive and modulate the directional light beams 102 from a second slanted multibeam column 120b. Thus, each of the light valve sets (e.g., the first and second light valve sets 130a, 130b) in the light valve array corresponds, respectively, both to a different slanted multibeam column 120 (e.g., columns 120a, 120b) with individual light valves 130 of the light valve sets corresponding to the pixels of the horizontal parallax multiview display 100, as illustrated in FIG. 3A. In various embodiments, different types of light valves may be employed as the light valves 130 of the light valve array including, but not limited to, one or more of liquid crystal light valves, electrophoretic light valves, and light valves based on electrowetting.

Note that herein the size of a pixel of the horizontal parallax multiview display 100 generally corresponds to a size of a light valve 130 in the light valve array. In particular, the pixel size may be equal to the size of the light valve 130, in some examples. In other examples, the pixel size may be defined as a distance (e.g., a center-to-center distance) between adjacent light valves 130 of the light valve array. In particular, the light valves 130 themselves may be smaller than the center-to-center distance between the light valves 130 in the light valve array. However, the pixel size may defined as the center-to-center distance.

For discussion purposes herein, the terms 'light valve' (e.g., light valve 130) and 'pixel' (e.g., when discussing a display pixel as opposed to a view pixel) may be used interchangeably unless a distinction is necessary for proper understanding. Further, for discussion purposes and unless otherwise stipulated, a light valve array or equivalently an array of pixels of the horizontal parallax multiview display 100 generally comprises a rectangular array having rows and columns, the columns being orthogonal to the rows. As illustrated by way of example and not limitation, the rows extend along the x-direction (or x-axis), while the columns are generally aligned with the y-direction (or y-axis).

In various embodiments, the slanted multibeam column 120 of the plurality of slanted multibeam columns comprises a slant. That is, the slanted multibeam column 120 may extend across a width of the light guide 110 at an angle relative to the y-axis, as illustrated. Equivalently, the slanted multibeam column 120 may extend at an angle relative to a column of pixels or equivalently a column of light valves 130 of the horizontal parallax multiview display 100. The slant of the slanted multibeam column 120 is an expression of the degree of steepness or incline of the slanted multibeam column 120 in relation to the column of light valves 130, or equivalently to the y-axis, as illustrated. In particular, the slant may be expressed as the horizontal distance of the slanted multibeam column 120 per each row of light valves 130 spanned by the slanted multibeam column 120. In some embodiments, the slant of the slanted multibeam column 120 is a function of a pixel width and a pixel-view arrangement of the horizontal parallax multiview display 100. Here, a 'pixel width' may be understood to be the pixel size along a direction corresponding to the row of pixels. Further, a pixel-view arrangement by definition herein comprises pixels corresponding to one or more sets of light valves 130 (e.g., light valve sets 130a, 130b, illustrated in FIG. 3A).

In particular, in some embodiments, the slant of the slanted multibeam column 120 is the pixel width divided by a number of rows of pixels (or light valves 130) in the pixel-view arrangement of the horizontal parallax multiview display 100. For example, in some embodiments, the pixel-view arrangement of the horizontal parallax multiview display 100 may comprise two rows and the slant of the slanted multibeam column 120 may be one half of the pixel width. In another embodiment, the pixel-view arrangement of the horizontal parallax multiview display may comprises a single row and the slant of the slanted multibeam column 120 may be one pixel width, for example. Further, a spacing between the slanted multibeam columns 120 of the slanted multibeam plurality may be a function of the pixel-view arrangement of the horizontal parallax multiview display 100. In particular, the spacing between centerlines of adjacent slanted multibeam columns 120 may be a function of a number of pixels in the pixel-view arrangement of the multiview display divided by a number of rows of the pixels in the pixel-view arrangement, according to some embodiments. In some embodiments, a pixel of the array of pixels or equivalently a pixel of a pixel-view arrangement may represent a color sub-pixel, the horizontal parallax multiview display being a color multiview display.

Figure 4:
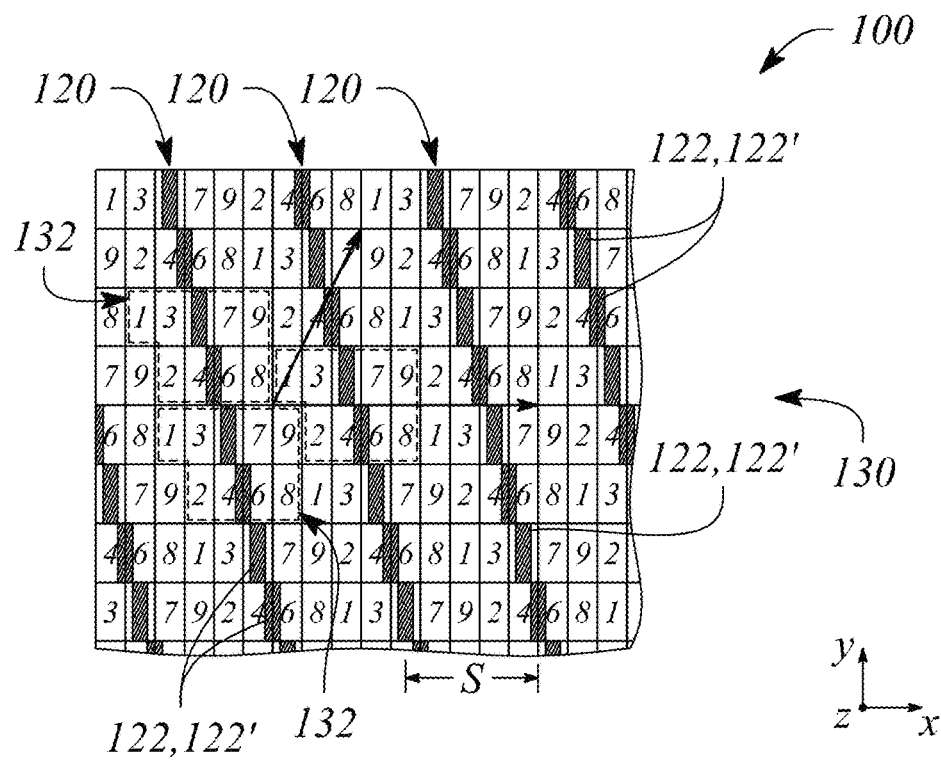
FIG. 4 illustrates a plan view of a portion of a horizontal parallax multiview display including a pixel-view arrangement and a slanted multibeam column in an example, according to an embodiment consistent with the principles disclosed herein.

FIG. 4 illustrates a plan view of a portion of a horizontal parallax multiview display 100 including a pixel-view arrangement 132 and a slanted multibeam column 120 in an example, according to an embodiment consistent with the principles disclosed herein. The horizontal parallax multiview display 100 illustrated in FIG. 4 has a view configuration of nine-by-one (9×1), by way of example and not limitation. That is, the illustrated horizontal parallax multiview display 100 provides nine (9) views of a multiview image in the horizontal direction (i.e., along the x-axis or in an x-z plane, as illustrated). Any of the nine views may be viewed over a wide range of angles in the vertical direction (e.g., as a 'single' view) in the vertical direction (i.e., along the y-axis or in an x-y plane, as illustrated). Thus, the horizontal parallax multiview display 100 may be referred to as a '9×1' horizontal parallax multiview display or as having a 9×1 view configuration. According to various embodiments, the horizontal parallax multiview display 100 may provide a substantially balanced resolution in the horizontal direction that is about the same or similar to a full parallax display.

Further, as illustrated in FIG. 4, a pixel-view arrangement 132 of the horizontal parallax multiview display 100 may comprise nine pixels, each pixel corresponding to a different one of the nine views. The pixel-view arrangement 132 of the horizontal parallax multiview display 100 illustrated in FIG. 4 comprises two adjacent rows of pixels. Further, pixels of the rows of pixels are numbered correspond to different numbered views, as illustrated. For example, a first row of the pixel-view arrangement 132 illustrated in FIG. 4 comprises pixels numbered corresponding to odd-numbered views arranged sequentially (i.e., views numbered 1, 3, 5, 7 and 9) and the second row comprises pixels corresponding to even-numbered views, also arranged sequentially (i.e., views numbered 2, 4, 6, and 8). Further, the pixels of the second row are offset from the pixels of first row by a pixel width such that a pixel labeled '2' of the second row (corresponding to view 2) is vertically aligned with a pixel labeled '3' of the first row (corresponding to view 3) (i.e., pixels 2 and 3 are adjacent pixels in a column of pixels, as illustrated). As illustrated in FIG. 4, each of the rows of pixels of the pixel-view arrangement 132 may correspond to a different set of light valves 130 of the light valve array (e.g., as illustrated in FIG. 3A).

FIG. 4 also illustrates a slanted multibeam column 120 that extends across the pixel-view arrangement 132 of the horizontal parallax multiview display 100. Specifically, the slanted multibeam column 120 extends across a width of the horizontal parallax multiview display 100 and passes near or through a center of the pixel-view arrangement 132. As illustrated, the slant of the slanted multibeam column 120 is a function of a pixel width and a pixel-view arrangement 132. In particular, the slant of the slanted multibeam column 120 illustrated in FIG. 4 is equal to the pixel width divided by a number of rows of pixels in the pixel-view arrangement 132. Accordingly, in FIG. 4, the slant of the slanted multibeam column 120 is given by the pixel width divided by two, or equivalently one half of a pixel-width. That is, the slanted multibeam column 120 is offset by one half of a pixel-width for each row of pixels (or light valves 130) the horizontal parallax multiview display 100. As illustrated, the slanted multibeam column 120 therefore extends through a centerline of pixel 5 located in the first row of the pixel-view arrangement 132 and then between pixel 4 and pixel 6 in the second row. As a result, the slanted multibeam column 120 may pass through the pixel-view arrangement at or near a centerline thereof.

The pixel-view arrangement 132 and the placement of the slanted multibeam column 120 across a center of the pixel-view arrangement 132 may provide the horizontal parallax multiview display 100 with a substantially balanced resolution, according to some embodiments. That is, views represented by the pixel-view arrangement 132 are spread across two rows, which may diminish an effective horizontal resolution, but increase the vertical resolution. Thus, a gap between the vertical resolution and the horizontal resolution may be reduced, providing about the same or similar resolution along the vertical and horizontal axes, in some embodiments. Further, in some embodiments, the slanted multibeam columns 120 may provide the same effective illumination as the light elements in a corresponding full parallax display. This is because the slanted multibeam columns 120 cover, or are superimposed on, about the same fraction of the surface area of the horizontal parallax multiview display 100 when compared to light elements of the full parallax display. In particular, the light element of the full parallax display may cover one view pixel out of nine view pixels of a multiview pixel, or equivalently three, color sub-pixels out of twenty-seven, color sub-pixels of the same multiview pixel. The light element therefore covers about one-ninth (⅑-th) of the surface area of the multiview pixel and the plurality of light elements of the full parallax multiview display may cover about one-ninth of the surface area of the full parallax multiview display. The horizontal parallax multiview display 100 with comparable resolution may preserve the same or about the same ratio of light element-to-pixels as the full parallax multiview display. As a result, a slanted multibeam column 120 covers about 1 of 9 the pixels in the pixel-view arrangement 132 of the embodiment of the horizontal parallax multiview display 100 depicted in FIG. 4. In the two-row, pixel-view arrangement 132 illustrated with respect to this embodiment, the slanted multibeam column 120 consequently has a width of a half-pixel and the two rows of half-pixel widths of slanted multibeam column 120 add up to a full pixel of slanted multibeam column 120 per a set of nine pixels in a pixel-view arrangement 132. In other embodiments, the slanted multibeam column 120 of the horizontal parallax multiview display 100 may provide more illumination than light elements in the corresponding full parallax display.

Accordingly, adjacent slanted multibeam columns 120 are separated by a distance approximately equal to a width of pixel-view arrangement 132. In particular, the distance separating centerlines of adjacent slanted multibeam columns 120 may be given by the number of pixels in the pixel-view arrangement 132 of the horizontal parallax multiview display 100 divided by the number of rows in the pixel-view arrangement 132. Applying this formula to the embodiment illustrated in FIG. 4, the distance between slanted multibeam columns 120 is four and one half (4.5) pixel widths.

As discussed above, in various embodiments, the slanted multibeam column 120 comprises a plurality of multibeam elements 122. In some embodiments, the plurality of multibeam elements 122 comprise discrete multibeam elements 122' with a different discrete multibeam element 122' for each row of pixels or row of light valves 130 of the horizontal parallax multiview display 100. For example, referring again to FIG. 4, the slanted multibeam column 120 are illustrated as a plurality of discrete multibeam elements 122'. Each discrete multibeam element 122' of the discrete multibeam element plurality is offset relative to adjacent discrete multibeam element 122' of the slanted multibeam column 120 to provide the slant of the slanted multibeam column 120. As illustrated in FIG. 4 where the slant of the multibeam column 120 is be equal to a half-width of a pixel, each discrete multibeam element 122' is offset in a horizontal direction (x-direction, as illustrated) from adjacent discrete multibeam elements 122' by the half-width of a pixel. Thus, the discrete multibeam element 122' in the second row of a pixel-view arrangement 132 is offset in the horizontal direction from the discrete multibeam element 122' in the first row of the same pixel-view arrangement 132. Further, the discrete multibeam element 122' of the first row of a next pixel-view arrangement 132 along the slanted multibeam column 120 is offset by half a pixel from the discrete multibeam element 122' of the second row of the previous pixel-view arrangement 132, and so on. In some embodiments, a spacing between discrete multibeam elements 122' is about equal to a spacing between adjacent rows of the array of pixels or light valve array.

Figure 5:
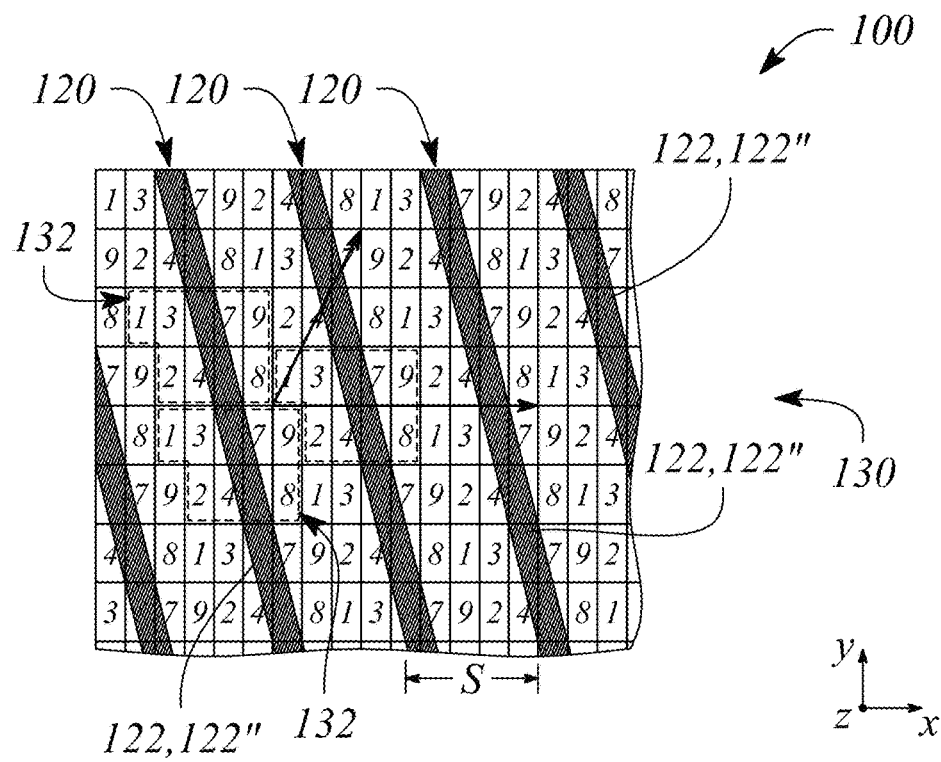
FIG. 5 illustrates a portion of a horizontal parallax multiview display having a slanted multibeam column comprising a continuous multibeam element in an example, according to an embodiment consistent with the principles disclosed herein.

In other embodiments, the slanted multibeam column 120 comprises a plurality of multibeam elements 122 arrange as a substantially continuous multibeam element 122". For example, when multibeam elements 122 of the multibeam element plurality each comprise a diffraction grating, the diffraction gratings of the multibeam elements 122 may be arrange end-to-end to effectively provide the continuous multibeam element 122". FIG. 5 illustrates a portion of a horizontal parallax multiview display 100 having a slanted multibeam column 120 comprising a continuous multibeam element 122" in an example, according to an embodiment consistent with the principles disclosed herein. As in FIG. 4, the embodiment of the horizontal parallax multiview display 100 depicted in FIG. 5 is configured to provide nine views in the horizontal direction (i.e., a 9×1 view configuration). Further, the pixel-view arrangement 132 is identical to the embodiment of FIG. 4, as illustrated. However, unlike the previous embodiment which had slanted multibeam columns 120 comprising a plurality of discrete multibeam elements 122' offset from one another to form the slant, the slanted multibeam column 120 illustrated in FIG. 5 comprises continuous multibeam element 122". The continuous multibeam element 122" may comprise diffraction gratings or similar multibeam element structures connected end-to-end to as the plurality of multibeam elements 122 and extends across the width of the light guide as the slanted multibeam column 120, as illustrated. The slant of the slanted multibeam column 120 comprising a continuous multibeam element 122" illustrated in FIG. 5 is given by the pixel width divided by the number of rows in the pixel-view arrangement 132, which yields half a pixel-width per row.

Figure 6:
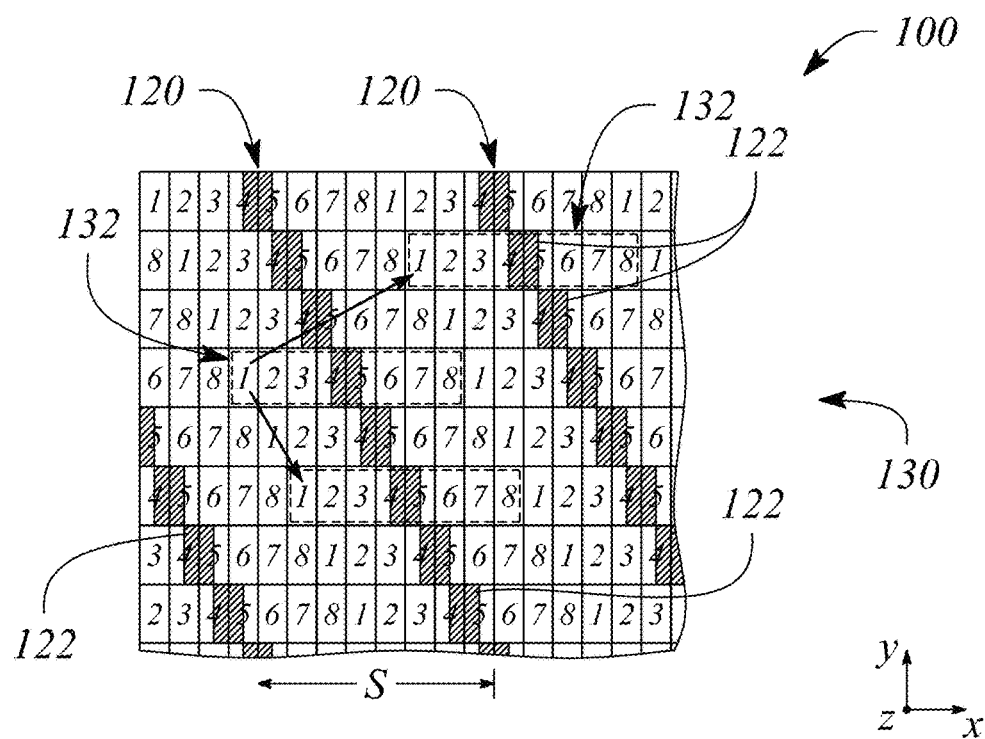
FIG. 6 illustrates a plan view of a portion of a horizontal parallax multiview display comprising slanted multibeam columns in an example, according to another embodiment consistent with the principle described herein.

FIG. 6 illustrates a plan view of a portion of a horizontal parallax multiview display 100 comprising slanted multibeam columns 120 in an example, according to another embodiment consistent with the principle described herein. The illustrated horizontal parallax multiview display 100 is configured to provide eight (8) views of a multiview image in the horizontal direction (i.e., an 8×1 view configuration). Unlike the displays of FIGS. 4 and 5, the pixel-view arrangement 132 of the horizontal parallax multiview display 100 of FIG. 6 comprises a single row of eight (8) sequentially arranged pixels. Horizontal parallax multiview display 100 further comprises a slanted multibeam column 120. The slanted multibeam column 120 comprises a plurality of a multibeam elements 122 offset in relation to other another to form the slant. In particular, the slant of the slanted multibeam column 120 as illustrated is equal to the pixel width. Multibeam elements 122 of the plurality of multibeam elements forming the slanted multibeam column 120 are therefore offset from one another by the width of a pixel. As previously discussed, a spacing S between centerlines of the slanted multibeam columns 120 of the slanted multibeam plurality is a function of the pixel-view arrangement 132 of the horizontal parallax multiview display 100. In particular, the spacing S is a function of a number of pixels (i.e., a number of light valves 130) in the pixel-view arrangement 132 of the illustrated horizontal parallax multiview display 100 divided by the number of rows of the pixels in the pixel-view arrangement 132. Accordingly, eight (8) pixels separate centerlines of the slanted multibeam columns 120 in the horizontal parallax multiview display 100 of FIG. 6.

In some embodiments, the horizontal parallax multiview display 100 is a color multiview display configured to provide or display color multiview images. In a color multiview display, different pixels may provide different colors (e.g., using color filters) and thus may be referred to as color sub-pixels. In particular, sets of color sub-pixels representing red-green-blue (RGB) may be provided adjacent to one another as different color light valves 130 in a light valve array. For example, color sub-pixels representing the different colors may alternate along a row of pixels (e.g., as red, green, blue, red, green, blue, and so on). In these embodiments, a multiview pixel of the color multiview display may be represented by (e.g., three) different sets of pixels in the pixel-view arrangement. For example, in FIG. 4 there may be three different sets of pixels in the pixel-view arrangement 132, as illustrated. Moreover, each of the different sets has a color sub-pixel representing a different color of light for each view. Thus, a first pixel set of the multiview pixel (i.e., a first pixel-view arrangement 132) may comprise a green color sub-pixel for view 1, a second pixel set (i.e., a second pixel-view arrangement 132) may comprise a blue color sub-pixel for view 1, and a third pixel set (i.e., a third pixel-view arrangement 132) may comprise a red color sub-pixel for view 1. Together, the three pixel sets (i.e., the three pixel-view arrangements 132) provide a color view pixel to view 1 having all three colors (red, green, blue). Similarly, in FIG. 6, the three pixel sets of a color multiview pixel may be provided by pixel-view arrangements 132 in three rows of pixels, as illustrated.

Referring again to FIGS. 3A-3C, the horizontal parallax multiview display 100 further comprises a light control film 140, as illustrated. According to various embodiments, the light control film 140 has a slanted light control axis aligned with the slanted multibeam column 120. That is, a slant or slant angle of the light control axis of the light control film 140 is aligned with or corresponds to a slant or slant angle of the slanted multibeam column 120. As such, the light control axis is substantially parallel to the slanted multibeam column 120, according to various embodiments. Further, the light control film 140 is configured to control a view angle of the multiview image in a direction orthogonal to the horizontal parallax, according to various embodiments. Alternatively, the light control film 140 may have little or no effect on the view angle of the multiview image in a direction corresponding to the horizontal parallax.

Figure 7A:
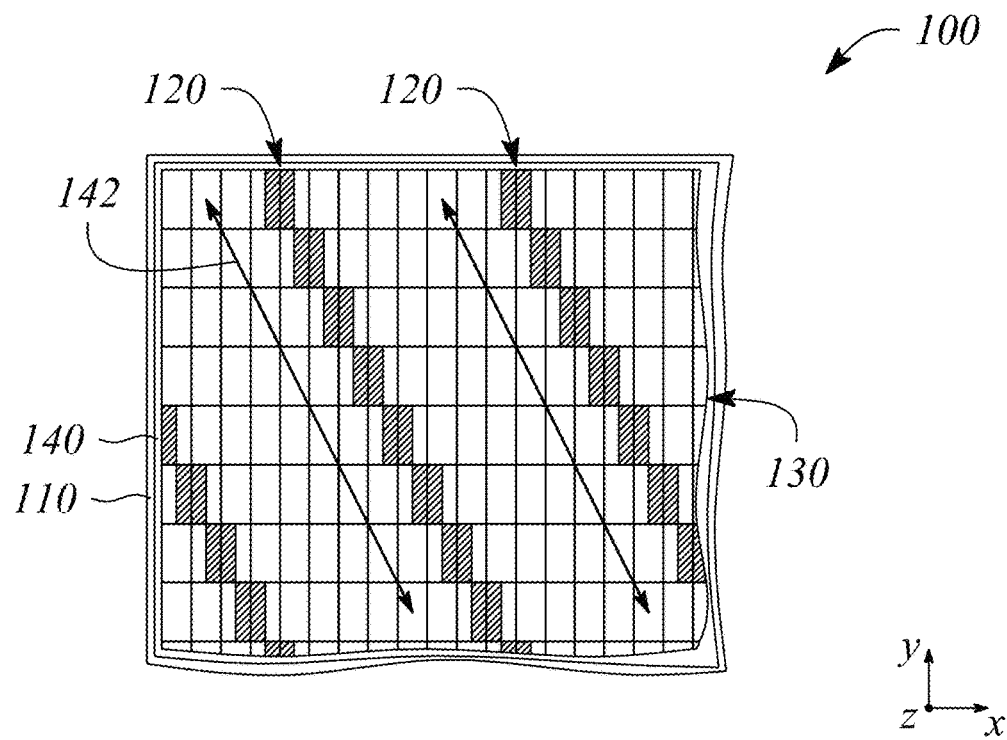
FIG. 7A illustrates a plan view of a horizontal parallax multiview display comprising slanted multibeam columns and a light control film in an example, according to an embodiment consistent with the principle described herein.

FIG. 7A illustrates a plan view of a horizontal parallax multiview display 100 comprising slanted multibeam columns 120 and a light control film 140 in an example, according to an embodiment consistent with the principle described herein. As illustrated, the light control axis 142 of the light control film 140 is aligned with (i.e., substantially parallel to) the slanted multibeam columns 120. In some embodiments, the light control film 140 may be located between the array of light valves 130 and a surface (e.g., the first surface 110') of the light guide 110, e.g., as illustrated in FIGS. 3B-3C. In other embodiments, the array of light valves 130 may be located between the light guide 110 and the light control film 140, e.g., as illustrated in FIGS. 3A and 7A, by way of example and not limitation.

Figure 7B:
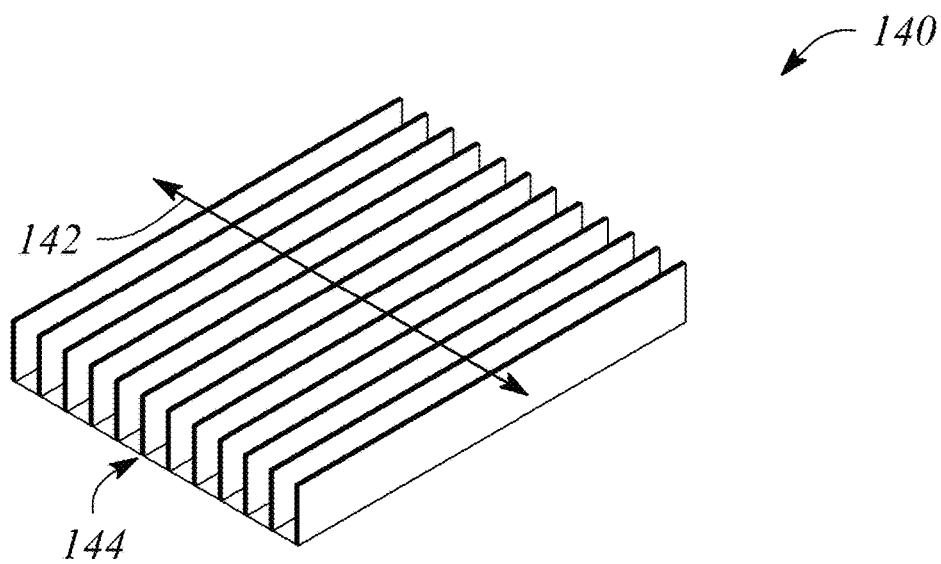
FIG. 7B illustrates a perspective view of a light control film in an example, according to another embodiment consistent with the principle described herein.

According to various embodiments, the light control film 140 may comprise any of a variety of light control films, privacy filters, and similar privacy films. FIG. 7B illustrates a perspective view of a light control film 140 in an example, according to another embodiment consistent with the principle described herein. As illustrated, the light control film 140 comprises a plurality of parallel micro-louvers or micro-baffles 144 which are configured to be opaque to light passing through the light control film 140. In between the parallel micro-baffles 144, the light control film 140 is substantially transparent to light. The parallel micro-baffles 144 provide a maximum amount of angular control in a direction perpendicular a length direction of the parallel micro-baffles 144. As such and by definition, the light control axis 142 is perpendicular to the length direction of the parallel micro-baffles 144, as illustrated. Examples of light control films that may be used as the light control film 140 include, but are not limited, various view control films (VC-films) manufactured by Shin-Etsu Polymers Europe B.V. that comprise an optical louver film of alternating optical clear silicon rubber and black silicon rubber layer, e.g., seewww.shinetsu.info/vc_film. In another non-limiting example, the light control film 140 may comprise an advanced light control film (e.g., ALCF-P or ALCF-A) manufactured by 3M Display Materials & Systems Division, St. Paul, MN.

Figure 7C:
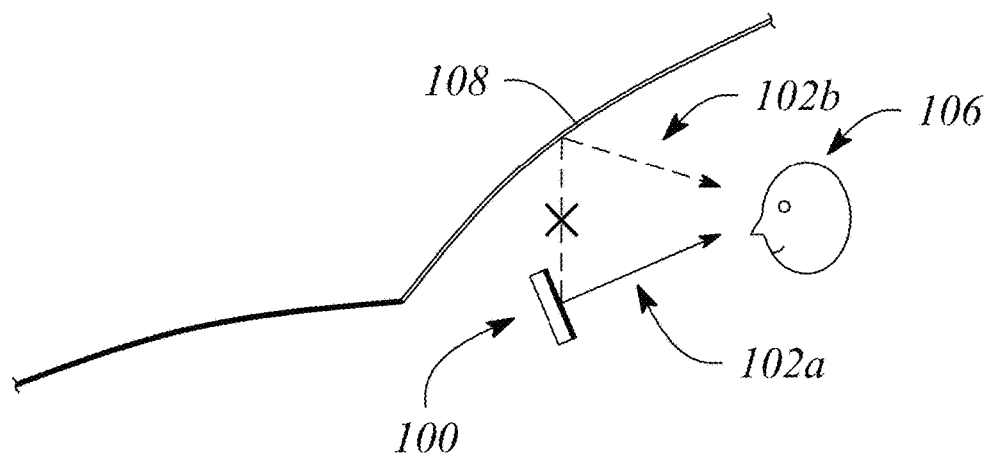
FIG. 7C illustrates a side view of a horizontal parallax multiview display having a light control film in an example, according to another embodiment consistent with the principle described herein.

According to various embodiments, the light control film 140 may minimize an angular visibility of the multiview image in a direction of the light control axis 142. As such, horizontal parallax multiview display 100 having the light control film 140 may be employed in situations where reflection may pose a problem. FIG. 7C illustrates a side view of a horizontal parallax multiview display 100 having a light control film 140 in an example, according to another embodiment consistent with the principle described herein. As illustrated, the horizontal parallax multiview display 100 is mounted in an instrument panel of an automobile. A driver 106 may readily view the multiview image in a direction 102a corresponding plane of the horizontal parallax of the horizontal parallax multiview display 100. On the other hand, the light control film 140 may essentially block a view of the horizontal parallax multiview display 100 that reflects off of a windshield 108 of the automobile, as illustrated by view direction 102b.

Figure 8:
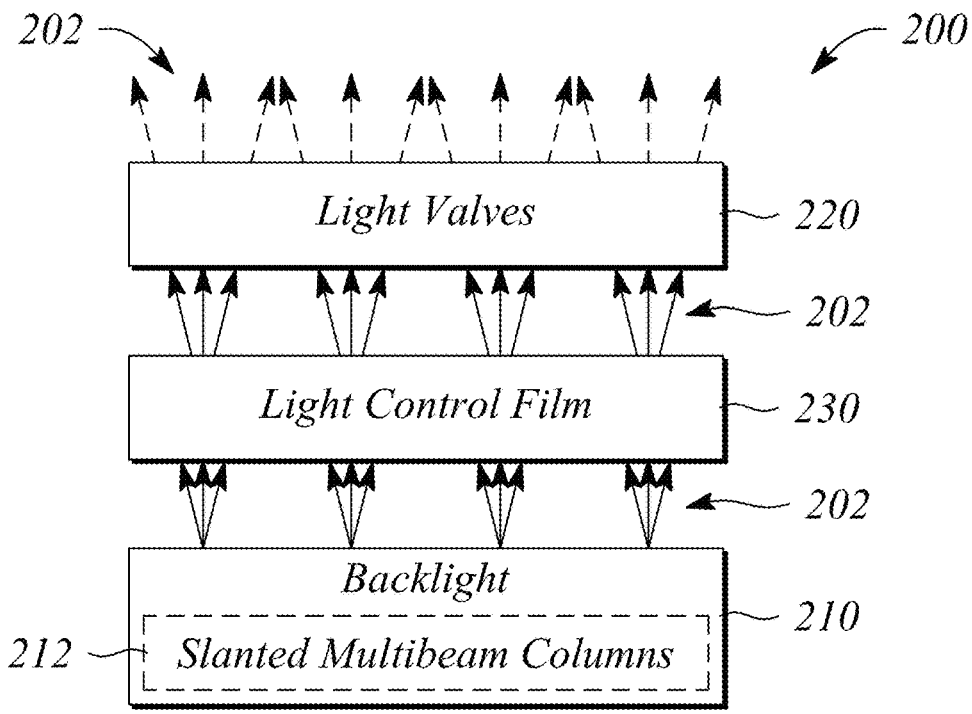
FIG. 8 illustrates a block diagram of a horizontal parallax multiview display in an example, according to an embodiment consistent with the principles described herein.

FIG. 8 illustrates a block diagram of a horizontal parallax multiview display 200 in an example, according to an embodiment consistent with the principles described herein. According to various embodiments, the illustrated horizontal parallax multiview display 200 employs slanted multibeam columns and pixel-view arrangements to display multiview image having horizontal parallax. The horizontal parallax multiview display 200 may provide a balanced resolution comparable to a corresponding full parallax display, in some embodiments.

As illustrated in FIG. 8, the horizontal parallax multiview display 200 comprises a backlight 210. The backlight 210 comprises a plurality of slanted multibeam columns 212 spaced apart from one another. In some embodiments, the plurality of slanted multibeam columns 212 of the backlight 210 may be substantially similar to the plurality of slanted multibeam columns 120 of the above-described horizontal parallax multiview display 100. For example, a slanted multibeam column 212 of the slanted multibeam column plurality may extend across a width of the backlight 210. The slanted multibeam columns 212 of the slanted multibeam column plurality are spaced apart across the length of the backlight 210, and may be parallel to one another, in some embodiments. In some embodiments, adjacent slanted multibeam columns 212 are separated from one another by a constant interval or distance.

According to various embodiments, a slanted multibeam column 212 of the slanted multibeam column plurality is configured to scatter out light of the backlight 210 as a plurality of directional light beams 202 having different principal angular directions corresponding to view directions of a multiview image. For example, the backlight 210 may comprise a light guide that is substantially similar to the light guide 110 described above with respect to the horizontal parallax multiview display 100 and the slanted multibeam column 212 may scatter out a portion of light guided within the light guide. The slanted multibeam column 212 may comprise any of a number of different structures configured to scatter out light of the backlight, including diffraction gratings, micro-reflective elements, micro-refractive elements, or various combinations thereof. For example, the slanted multibeam column 212 may comprise a diffraction grating. The diffraction grating may be substantially similar to the diffraction grating of the horizontal parallax multiview display 100 previously described.

As illustrated in FIG. 8, the horizontal parallax multiview display 200 further comprises an array of light valves 220 configured to modulate directional light beams of the plurality of directional light beams to provide the multiview image. In various embodiments, a light valve 220 of the array corresponding to a pixel of the multiview pixel of the horizontal parallax multiview display 200. In various embodiments, different types of light valves may be employed as the light valves 220 of the light valve array including, but not limited to, one or more of liquid crystal light valves, electrophoretic light valves, and light valves based on electrowetting. In particular, directional light beams 202 from the array of slanted multibeam columns 212 on the backlight 210 may pass through and be modulated by individual light valves 220 of the light valve array to provide modulated directional light beams 202. Different ones of the directional light beams 202 having different principal angular directions are configured to pass through and be modulated by different ones of the light valves 220 in the light valve array. Dashed arrows in FIG. 8 are used to illustrate the modulated directional light beams 202 to emphasize modulation thereof. Further, a size of a pixel of the horizontal parallax multiview display 200 may correspond to a size of a light valve 220 of the array. In some embodiments, the array of light valves may be substantially similar to the array of light valves 130, described above with respect to the horizontal parallax multiview display 100.

In various embodiments, the slanted multibeam column 212 of the plurality of slanted multibeam columns has a slant relative to a column of light valves 220 of the light valve array. Further, the slant is a function of a pixel width and a pixel-view arrangement of the horizontal parallax multiview display 200, according to various embodiments. In particular, the slant may be expressed as a change in a local horizontal location of the slanted multibeam column 212 relative to the light valve column per row of pixels or light valves 220 spanned by the slanted multibeam column 212. As such, the slant of the slanted multibeam column 212 may be substantially similar to the slant of the slanted multibeam column 120 of the horizontal parallax multiview display 100, described above. That is, in some embodiments, the slant of the slanted multibeam column 212 is equal to the pixel width divided by a number of rows of pixels in the pixel-view arrangement of the horizontal parallax multiview display 200. For example, a pixel-view arrangement of the horizontal parallax multiview display 200 configured to provide nine (9) views in the horizontal direction may comprise nine pixels, each pixel corresponding to a different one of the nine views. Further, the pixel-view arrangement of the horizontal parallax multiview display 200 may comprise two adjacent rows of pixels, where a first row includes odd-numbered views arranged sequentially (e.g., views numbered 1, 3, 5, 7 and 9) and a second row includes even-numbered views, also arranged sequentially (e.g., views numbered 2, 4, 6, and 8), for example. In addition, the second row may be offset from the first row as illustrated in FIG. 4, described above. In this example, the slant of the slanted multibeam column 212 may be equal to the pixel width divided by two, which yields a slant of one half of a pixel width.

In some embodiments, a spacing between centerlines of the slanted multibeam columns 212 of the slanted multibeam plurality is given by a number of pixels in the pixel-view arrangement of the horizontal parallax multiview display 100 divided by a number of rows of the pixels in the pixel-view arrangement. For example, with respect to the embodiment previously described, the distance between slanted multibeam columns 212 may be about four and one half pixels (i.e., 4.5 pixel widths).

In some embodiments, the slanted multibeam column 212 may comprise a plurality of discrete multibeam elements, each discrete multibeam element of the plurality being offset from adjacent discrete multibeam elements by a distance corresponding to a spacing between adjacent rows of light valves 220 of the light valve array. Further, each discrete multibeam element of the plurality may be offset in relation to adjacent discrete multibeam elements to provide the slant of the slanted multibeam column 212. For example, in a slanted multibeam column having a slant of half a pixel width as described above, each discrete multibeam element may be offset from an adjacent multibeam element by half a pixel width, in some embodiments. In some embodiments, the discrete multibeam elements may be substantially similar to the multibeam elements 122 and more particularly to the discrete multibeam elements 122' described above with respect to the slanted multibeam column 120 of the horizontal parallax multiview display 100. In some embodiments, the slanted multibeam column 212 may comprise a continuous multibeam element. The continuous element is substantially similar to the continuous multibeam element 122" of the horizontal parallax multiview display 100, previously described, in some embodiments.

The horizontal parallax multiview display 200 illustrated in FIG. 8 further comprises a light control film 230 configured to control a view angle of the multiview image in a direction orthogonal to the horizontal parallax. According to some embodiments, the light control film 230 may be substantially similar to the light control film 140 described above with respect to the horizontal parallax multiview display 100. In particular, the light control film 230 has a slanted light control axis aligned with the slanted multibeam columns 212. That is the slanted light control axis of the light control film 230 is parallel to the slanted multibeam columns 212 of the backlight 210, according to various embodiments. In some embodiments, the array of light valves 220 is between the light control film 230 and the backlight 210 having the plurality of slanted multibeam columns 212, as illustrated in FIG. 8. In other embodiments not explicitly illustrated with respect to the horizontal parallax multiview display 200, the light control film 230 may be located between the array of light valves 220 and the backlight 210.

Figure 9:
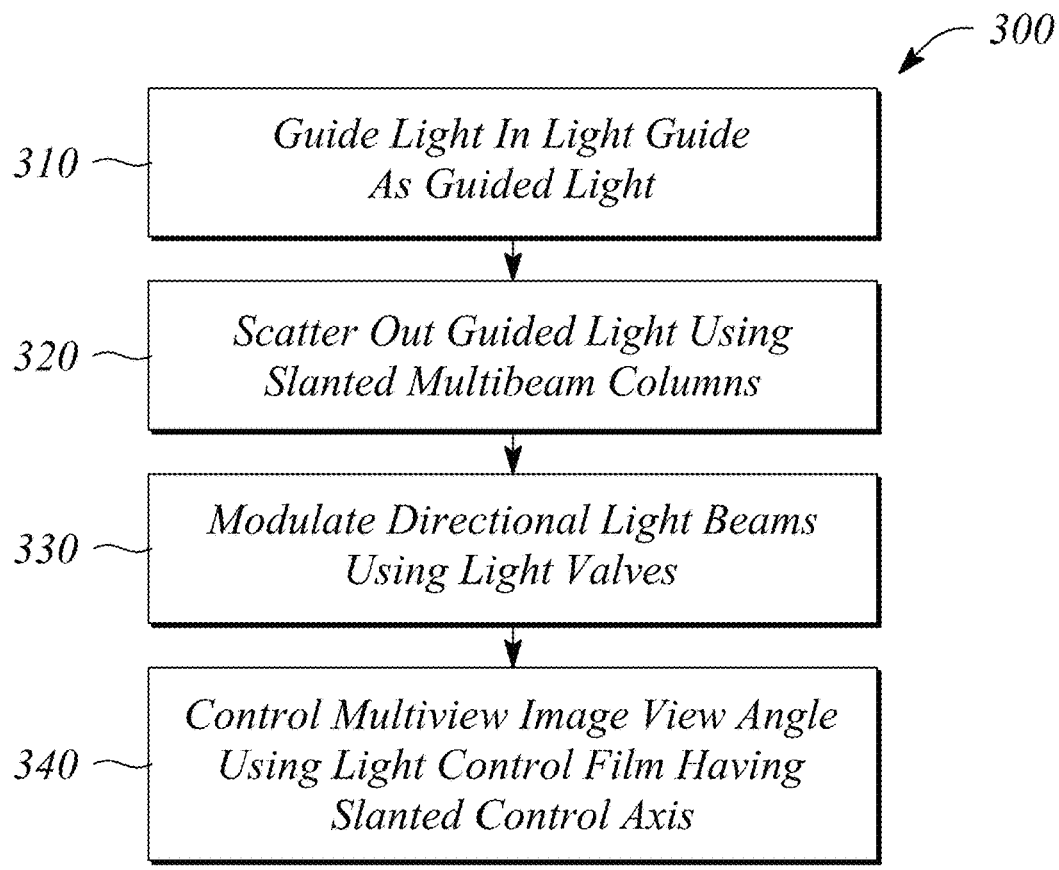
FIG. 9 illustrates a flow chart of a method of multiview display operation in an example, according to an embodiment consistent with the principles herein.

In accordance with some embodiments of the principles described herein, a method of multiview display operation using a horizontal parallax multiview display is provided. FIG. 9 illustrates a flow chart of a method 300 of multiview display operation in an example, according to an embodiment consistent with the principles herein. As illustrated in FIG. 9, the method 300 of multiview display operation comprises guiding 310 light along a length of a light guide as guided light. According the various embodiments, the guided light may be guided at a non-zero propagation angle within the light guide. In some embodiments, the light guide may be substantially similar to the light guide 110 described above with respect to the horizontal parallax multiview display 100. For example, the guided light may be guided and thus propagates along the light guide using total internal reflection within the light guide.

The method 300 of multiview display operation further comprises scattering out 320 from the light guide a portion of the guided light as directional light beams using a plurality of slanted multibeam columns distributed and spaced apart from one another along the light guide length. The directional light beams have directions corresponding to view directions of a multiview image or equivalent of the multiview display, according to various embodiments. In some embodiments, the slanted multibeam columns of the light guide may be substantially similar to the slanted multibeam columns 120 of the above-described horizontal parallax multiview display. For example, the slanted multibeam column of the plurality extends along a width of, and is oriented substantially along they-axis of, the light guide. Further, the slanted multibeam columns of the plurality may be spaced apart across the length of the light guide, and also may be parallel to one another, in some embodiments.

In some embodiments, the adjacent multibeam columns of the plurality are separated from one another by the same interval or distance. The slanted multibeam column may comprise any of a number of different structures configured to scatter out of the light guide the portion of the guided light, including diffraction gratings, micro-reflective elements, micro-refractive elements, or various combinations thereof. For example, the slanted multibeam column may comprise a diffraction grating. The diffraction grating may be substantially similar to the diffraction grating of the horizontal parallax multiview display 100 previously described.

As illustrated in FIG. 9, the method 300 of multiview display operation further comprises modulating 330 the directional light beams using an array of light valves to provide a multiview image having horizontal parallax, a light valve of the array corresponding to a pixel of the multiview display. In some embodiments, the array of light valves may be substantially similar to the array of light valves 130 of the above-described horizontal parallax multiview display 100. In various embodiments, different types of light valves may be employed as the light valves of the light valve array including, but not limited to, one or more of liquid crystal light valves, electrophoretic light valves, and light valves based on electrowetting.

In various embodiments, the slanted multibeam column of the plurality of slanted multibeam columns has a slant that is a function of a pixel width and a pixel-view arrangement of the horizontal parallax multiview display. The slant may be expressed as a change in a local horizontal location of the slanted multibeam column per row of pixels or row of light valves spanned by the slanted multibeam column. In some embodiments, the slant of the slanted multibeam column is equal to the pixel width divided by a number of rows of pixels in the pixel-view arrangement of the horizontal parallax multiview display. In some embodiments, the slant is substantially similar to the slant of the slanted multibeam column 120, described above. For example, the slant of the slanted multibeam column may correspond to one half of the pixel width when the pixel-view arrangement has two rows of pixels or equivalently two rows of light valves. In another example, the slant of the slanted multibeam column may correspond to the pixel width when the pixel-view arrangement has one row of pixels or light valves.

In some embodiments, a slanted multibeam column of the slanted multibeam column plurality comprises a plurality of discrete multibeam elements, each discrete multibeam element being spaced apart from other discrete multibeam elements of the plurality of discrete multibeam elements along a length of the slanted multibeam column. Further, each discrete multibeam element of the plurality may be offset in relation to adjacent discrete multibeam elements to provide the slant of the slanted multibeam column. For example, in a slanted multibeam column having a slant of half a pixel width, each discrete multibeam element may be offset from an adjacent multibeam element by one half of a pixel width. In some embodiments, the discrete multibeam elements may be substantially similar to the multibeam elements 122 and more particularly to the discrete multibeam elements 122' described above with respect to the slanted multibeam column 120 of the horizontal parallax multiview display 100.

In other embodiments, a slanted multibeam column of the slanted multibeam column plurality comprises a continuous multibeam element that extends along a length of the slanted multibeam column. In some embodiments, the continuous element may be substantially similar to the continuous multibeam element 122" of the horizontal parallax multiview display 100 previously described, in some embodiments.

As illustrated in FIG. 9, the method 300 of multiview display operation further comprises controlling 340 a view angle of the multiview image in a direction orthogonal to the horizontal parallax using a light control film having a slanted light control axis aligned with a slant of the slanted multibeam column plurality. According to some embodiments, the light control film may be substantially similar to the above-described light control film 140 of the horizontal parallax multiview display 100. For example, the light control film may comprise micro-louvers and the light control axis may be defined as a direction perpendicular to a direction of the micro-louvers. In some embodiments, the light control film may be located between the array of light valves and a surface of the light guide, while the light valve array may be located between the light control film and the light guide surface, in other embodiments.

Thus, there have been described examples and embodiments of a horizontal parallax multiview display and a method of operating a multiview display to display a multiview image using a horizontal parallax multiview display having a light control film with a slanted light control axis. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A horizontal parallax multiview display comprising:
a light guide configured to guide light;
a plurality of slanted multibeam columns distributed across the light guide and being configured to scatter out guided light from within the light guide as directional light beams having principal angular directions corresponding to different view directions of the horizontal parallax multiview display;
an array of light valves representing pixels of the horizontal parallax multiview display, the light valve array being configured to modulate the directional light beams as a multiview image having horizontal parallax; and
a light control film having a slanted light control axis aligned with a slanted multibeam column of the slanted multibeam column plurality, the light control film comprising parallel micro-baffles configured to control a view angle of the multiview image in a direction orthogonal to the horizontal parallax by allowing directional light beams having principal angular directions in a specified angular range to pass without redirection through the parallel micro-baffles and blocking directional light beams having principal angular directions outside the specified angular range.

2. The horizontal parallax multiview display of claim 1, wherein a slope of the slanted multibeam column is equal to a width of a pixel of the horizontal parallax multiview display divided by a number of rows of the pixels in a pixel-view arrangement of the horizontal parallax multiview display.

3. The horizontal parallax multiview display of claim 2, wherein the pixel-view arrangement of the horizontal parallax multiview display comprises two rows, the slope of the slanted multibeam column being one half of the pixel width.

4. The horizontal parallax multiview display of claim 1, wherein a spacing between centerlines of the slanted multibeam columns of the slanted multibeam column plurality is a function of a number of pixels in a pixel-view arrangement of the multiview display divided by a number of rows of the pixels in the pixel-view arrangement.

5. The horizontal parallax multiview display of claim 1, wherein a pixel of the horizontal parallax multiview display comprises a color sub-pixel, the horizontal parallax multiview display being a color multiview display.

6. The horizontal parallax multiview display of claim 1, wherein the slanted multibeam column comprises a plurality of discrete multibeam elements, each discrete multibeam element of the plurality being offset in relation to adjacent discrete multibeam elements of the slanted multibeam column to provide a slope of the slanted multibeam column.

7. The horizontal parallax multiview display of claim 6, wherein a spacing between discrete multibeam elements of the plurality is about equal to a spacing between adjacent rows of the light valve array.

8. The horizontal parallax multiview display of claim 6, wherein the discrete multibeam element of the slanted multibeam column comprises a diffraction grating configured to diffractively scatter out the guided light.

9. The horizontal parallax multiview display of claim 1, wherein the slanted multibeam column comprises a continuous multibeam element.

10. The horizontal parallax multiview display of claim 1, wherein a width of the slanted multibeam column is between one half of a width of a pixel and the width of the pixel of the horizontal parallax multiview display.

11. The horizontal parallax multiview display of claim 1, wherein the light control film is located between the array of light valves and a surface of the light guide.

12. A horizontal parallax multiview display comprising:
a backlight having a plurality of slanted multibeam columns, a slanted multibeam column of the slanted multibeam column plurality being configured to scatter out light from the backlight as directional light beams having principal angular directions corresponding to different view directions of a multiview image having horizontal parallax;
an array of light valves configured to modulate the directional light beams as the multiview image, a light valve of the light valve array corresponding to a pixel of the horizontal parallax multiview display; and
a light control film having a slanted light control axis aligned with the slanted multibeam column, the light control film comprising parallel micro-baffles configured to control a view angle of the multiview image in a direction orthogonal to the horizontal parallax by allowing directional light beams having principal angular directions in a specified angular range to pass without redirection through the parallel micro-baffles and blocking directional light beams having principal angular directions outside the specified angular range.

13. The horizontal parallax multiview display of claim 12, wherein the backlight further comprises a light guide and the slanted multibeam column comprises a diffraction grating, the plurality of slanted multibeam columns being spaced apart along a length of the light guide and the diffraction grating of the slanted multibeam column being configured to diffractively scatter out guided light from within the light guide as the directional light beams.

14. The horizontal parallax multiview display of claim 12, wherein the slanted multibeam column comprises a plurality of discrete multibeam elements, each discrete multibeam element of the plurality being offset from adjacent discrete multibeam elements by a distance corresponding to a spacing between adjacent rows of light valves of the light valve array.

15. The horizontal parallax multiview display of claim 12, wherein the slanted multibeam column comprises a continuous multibeam element.

16. The horizontal parallax multiview display of claim 12, wherein the array of light valves is between the light control film and the backlight having the plurality of slanted multibeam columns.

17. A method of multiview display operation, the method comprising:
guiding light along a length of a light guide;
scattering out guided light from the light guide as directional light beams using a plurality of slanted multibeam columns distributed along the light guide length, the directional light beams having directions corresponding to view directions of the multiview display;
modulating the directional light beams using an array of light valves to provide a multiview image having horizontal parallax, a light valve of the array corresponding to a pixel of the multiview display; and controlling a view angle of the multiview image in a direction orthogonal to the horizontal parallax using a light control film having a slanted light control axis aligned with a slope of a slanted multibeam column of the slanted multibeam column plurality, the light control film comprising parallel micro-baffles configured to control the view angle by allowing directional light beams having directions in a specified angular range to pass without redirection through the parallel micro-baffles and blocking directional light beams having directions outside the specified angular range.

18. The method of multiview display operation of claim 17, wherein the slope of the slanted multibeam column is a function of a pixel width and a pixel-view arrangement of the multiview display, the slope corresponding to one half of the pixel width when the pixel-view arrangement has two rows of pixels and the slope corresponding to the pixel width when the pixel-view arrangement has one row of pixels.

19. The method of multiview display operation of claim 17, wherein the slanted multibeam column of the slanted multibeam column plurality comprises a plurality of discrete multibeam elements, each discrete multibeam element being spaced apart from other discrete multibeam elements of the plurality of discrete multibeam elements along a length of the slanted multibeam column.

20. The method of multiview display operation of claim 17, wherein the light control film is located between the array of light valves and a surface of the light guide.

* * * * *